(12) United States Patent
Fahley et al.

(10) Patent No.: US 6,556,115 B1
(45) Date of Patent: Apr. 29, 2003

(54) ASSEMBLY APPARATUS FOR MAGNETIZING MAGNETS

(75) Inventors: Terry R. Fahley, Lakeville, MN (US); Paul L. Johnson, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/465,924

(22) Filed: Dec. 17, 1999

Related U.S. Application Data
(60) Provisional application No. 60/130,285, filed on Apr. 21, 1999.

(51) Int. Cl.[7] .............................. H01F 13/00; H01F 7/20
(52) U.S. Cl. .................................................... 335/284
(58) Field of Search ........................ 335/284, 296–301; 324/318, 319, 320

(56) References Cited

U.S. PATENT DOCUMENTS

| | | | |
|---|---|---|---|
| 2,125,628 A | 8/1938 | Fredrickson | 175/21 |
| 4,186,364 A | 1/1980 | Hanaoka | 335/284 |
| 4,707,677 A | * 11/1987 | Oudet | 335/284 |
| 4,737,753 A | 4/1988 | Oudet | 335/284 |
| 5,072,321 A | 12/1991 | Kanai et al. | 360/99.04 |
| 5,075,814 A | 12/1991 | Kubota et al. | 361/143 |
| 5,079,534 A | * 1/1992 | Steingroever et al. | 335/284 |
| 5,126,720 A | * 6/1992 | Zhou et al. | 340/572 |
| 5,319,335 A | * 6/1994 | Huang et al. | 335/284 |
| 5,659,279 A | 8/1997 | Janssen et al. | 335/284 |
| 5,745,970 A | 5/1998 | Sakashita et al. | 29/407.05 |

* cited by examiner

*Primary Examiner*—Ramon M. Barrera
(74) *Attorney, Agent, or Firm*—Westman, Champlin & Kelly, P.A.

(57) ABSTRACT

A magnetizing apparatus for magnetizing magnets including an assembly construction for easy maintenance and service which does not need to be completely disassembly for maintenance or service of magnetizing components and which does not require extension recalibration prior to resuming production.

19 Claims, 10 Drawing Sheets

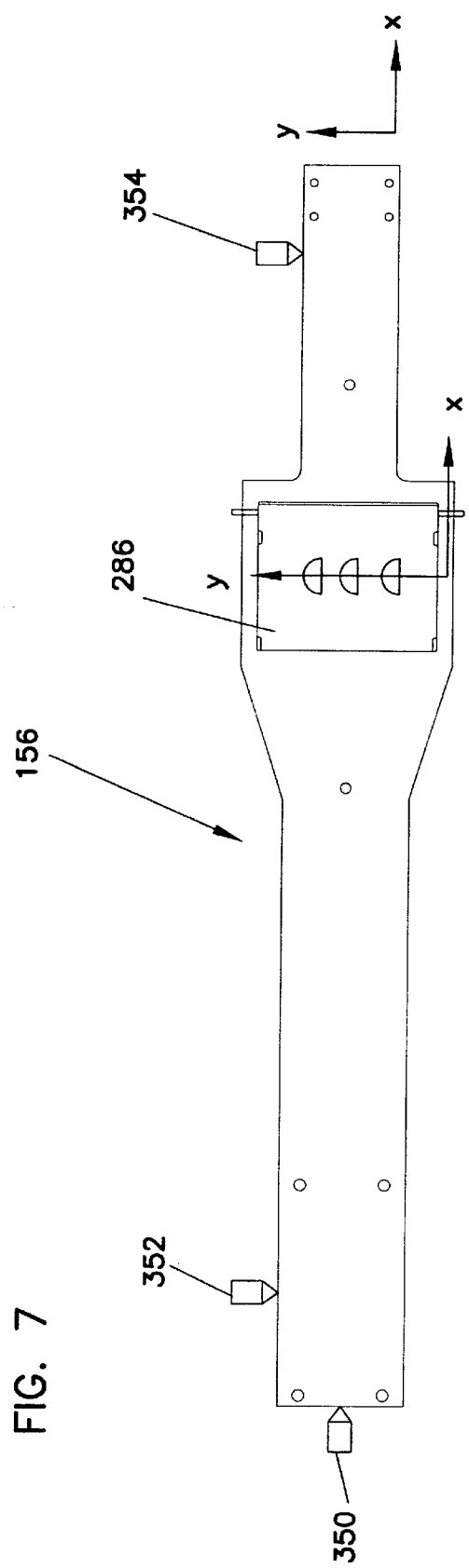

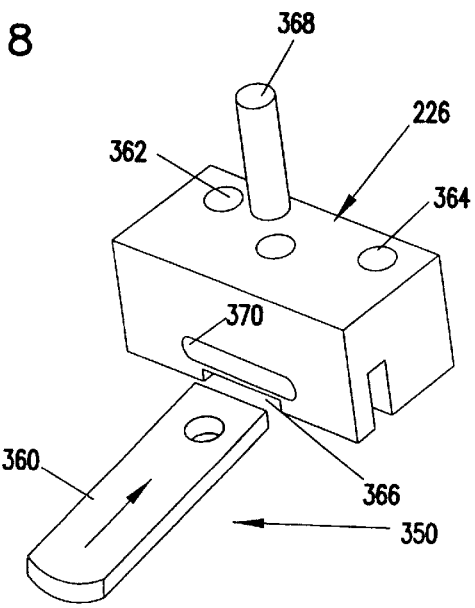
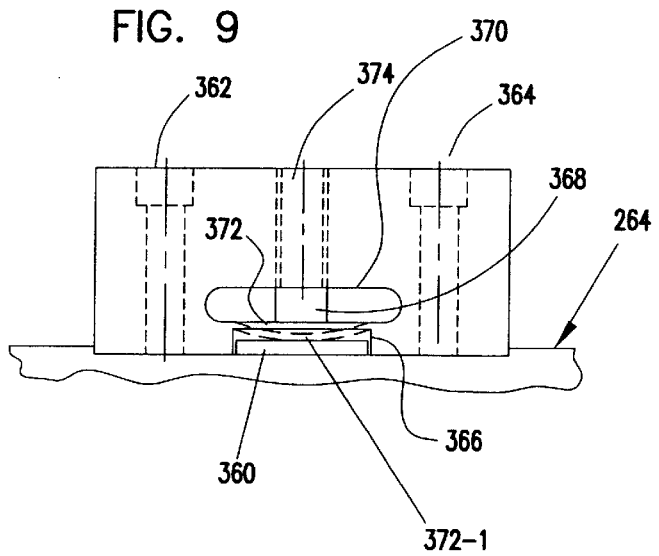
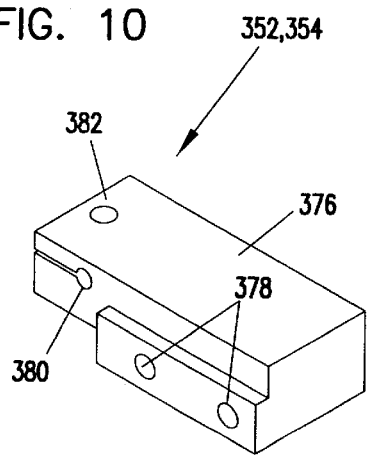

ASSEMBLY APPARATUS FOR MAGNETIZING MAGNETS

CROSS-REFERENCE TO RELATED APPLICATION

This application claims priority to Provisional Patent Application Serial No. 60/130,285, filed Apr. 21, 1999, entitled "USER AND MAINTENANCE FRIENDLY TRIPLE MAGNETIZER SHUTTLE".

FIELD OF THE INVENTION

The present invention relates to an apparatus for magnetizing magnets for a voice coil motor.

BACKGROUND OF THE INVENTION

Disc drives store digital information on discs. Heads are supported to read data from or write data to discs. Typically, heads are movably supported by a head stack assembly for placement relative to selected tracks of a disc. Head stack assemblies are coupled to voice coil motors to position heads relative to selected data tracks for read/write operations. The voice coil motor includes a plurality of magnetized magnets to form magnetic flux fields for operating the voice coil motor for head placement.

Disc drives are assembly in large volumes in manufacturing facilities. Assembly of disc drives includes the process of magnetizing magnets of the voice coil motor. Magnets are magnetized using a magnetizing apparatus. Components of the magnetizing apparatus typically require periodic service, cleaning or maintenance due to their extensive use which may interrupt disc drive production. Prior assembly apparatus for magnetizing magnets required extensive disassembly of the apparatus components for service or maintenance which can significantly interfere with disc drive production. Further, prior to resuming operation, the disassembled components needed to be completely realigned which adds costs and delays use of the apparatus. The present invention relates to an assembly apparatus for magnetizing magnets for assembly of a disc drive which addresses these and other problems, and offers other advantages over the prior art.

SUMMARY OF THE INVENTION

The present application relates to a magnetizing apparatus for magnetizing magnets including an assembly construction for easy maintenance and service which does not need to be completely disassembly for maintenance or service of magnetizing components and which does not require extension recalibration prior to resuming production. These and other beneficial features of the present invention will become apparent upon review of the following FIGS. and related explanations.

BRIEF DESCRIPTION OF THE DRAWINGS

FIGS. 5-1 through 5-3 are schematic diagrams progressively illustrating operations of an embodiment of shuttle and shift actuators for moving magnets along operating strokes for magnetization.

FIG. 7 is a schematic illustration of longitudinal and transverse locating gages for positioning a shuttle blade supporting magnets for operation along an operating stroke.

FIG. 8 is a perspective illustration of an embodiment of a longitudinal gage for positioning shuttle blade along the longitudinal axis of an operating stroke.

FIG. 9 is an elevational view of the gage illustrated in FIG. 8.

FIG. 10 is a perspective illustration of an embodiment of a transverse gage for positioning shuttle blade along an axis transverse to the longitudinal axis of the operating stroke.

DETAILED DESCRIPTION OF AN ILLUSTRATIVE EMBODIMENT

Figure 1:
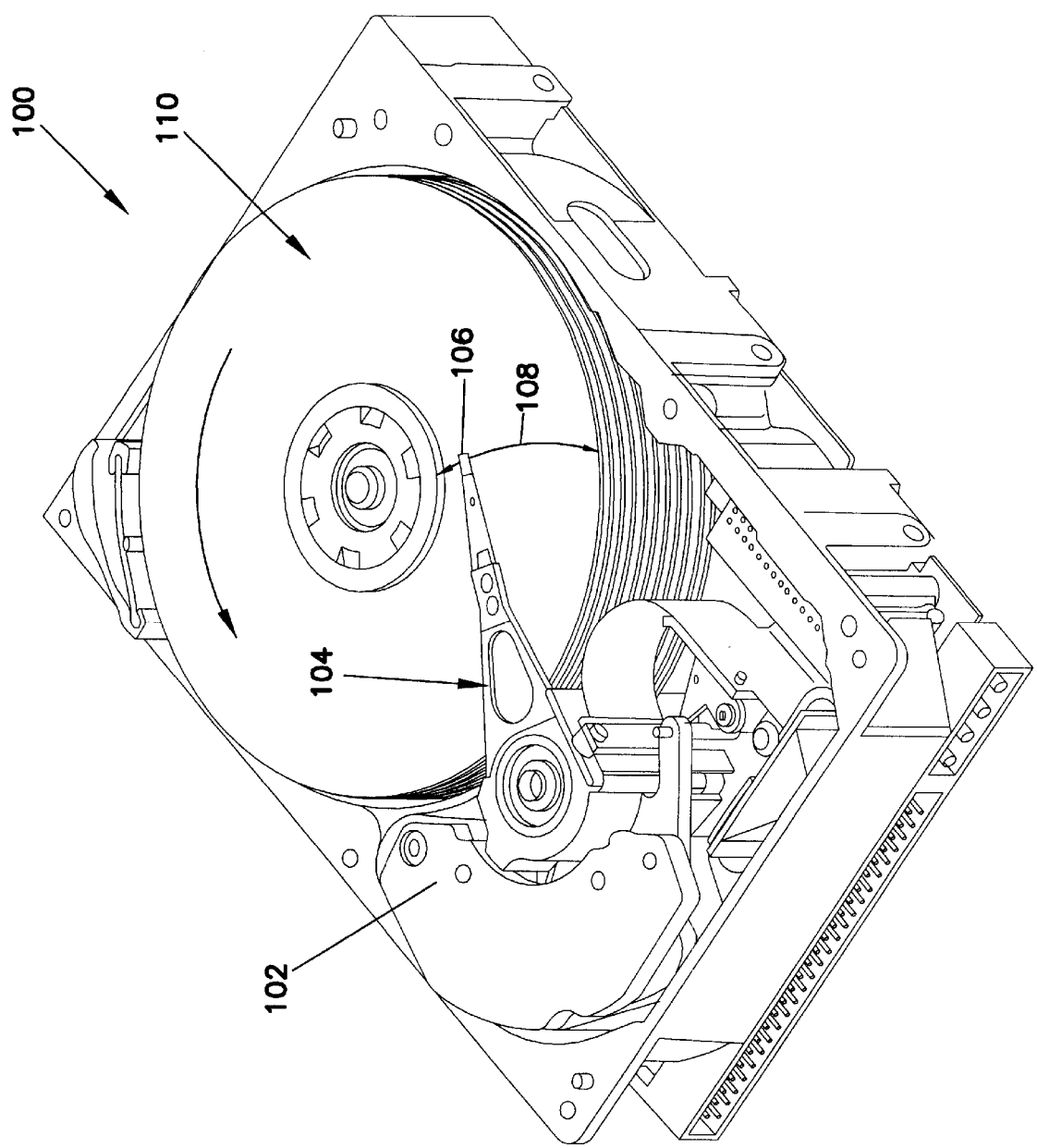
FIG. 1 is a perspective illustration of an embodiment of a disc drive.

The present invention relates to a device for magnetizing magnets and has application for magnetizing magnet components of a disc drive 100 illustrated in FIG. 1. Disc drive illustrated in FIG. 1 includes a voice coil motor 102 coupled to an actuator or E-block 104 supporting heads 106. The voice coil motor (VCM) 102 rotates the E-block 104 as illustrated by arrow 108 to move head 106 along an arcuate path for placement relative to data tracks of discs 110 for read or write operations.

Figure 2:
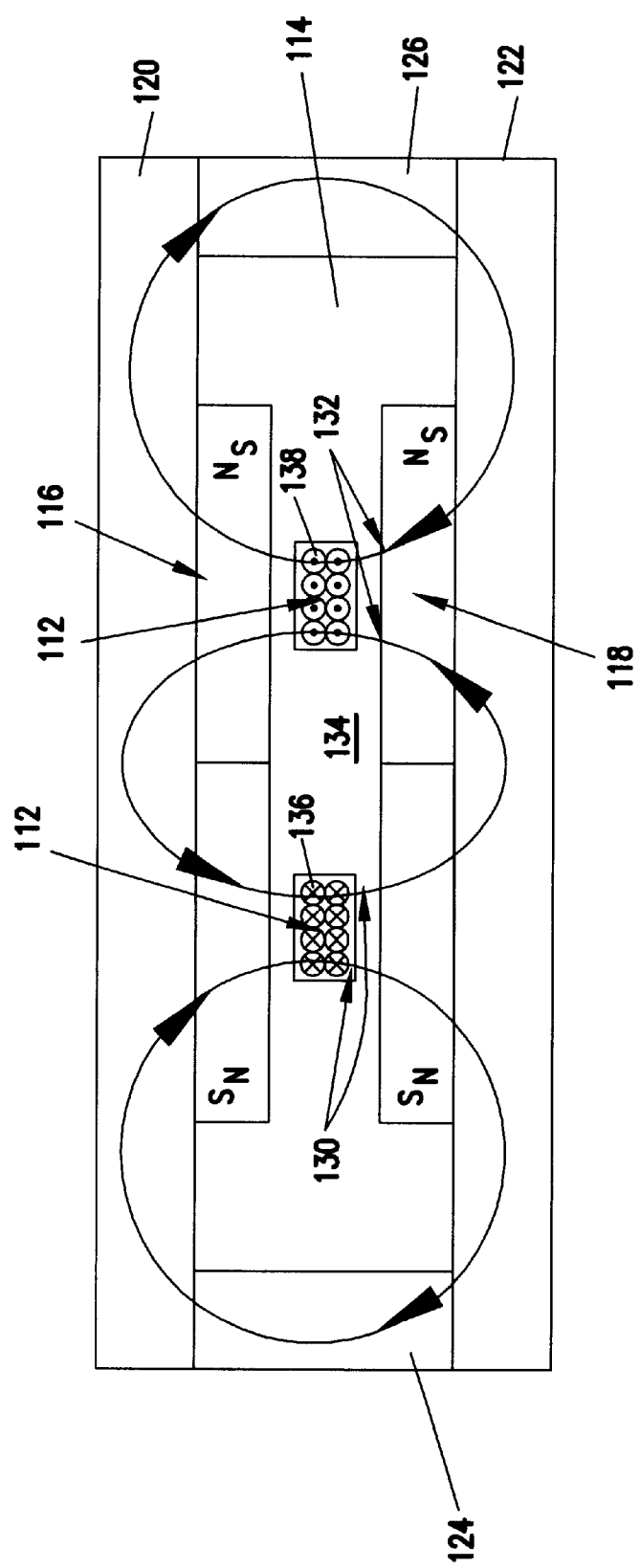
FIG. 2 is a schematic illustration of voice coil motor.

E-block 104 includes a wound voice coil 112 (shown diagrammatically in FIG. 2). The voice coil 112 operates in a permanent magnetic flux field. Current is supplied to the voice coil 112 to rotate E-block 104 as illustrated by arrow 108 in FIG. 1. The applied current determines the direction and speed of rotation of the voice coil 112 and actuator or E-block 104 for head placement. Permanent magnetic flux field is formed in gap 114 between permanent magnets 116, 118. Permanent magnets 116, 118 are supported by back-irons 120, 122 separated by spacers 124, 126. Permanent magnets 116, 118 include opposed flux zones 130, 132 separated by a transition zone 134. Coil legs 136, 138 are located relative to flux zones 130, 132 and current is supplied to coil legs 136, 138 to rotate E-block 104 for head placement. Accurate placement of the flux and transition zones is important for accurate head placement.

Figure 3:
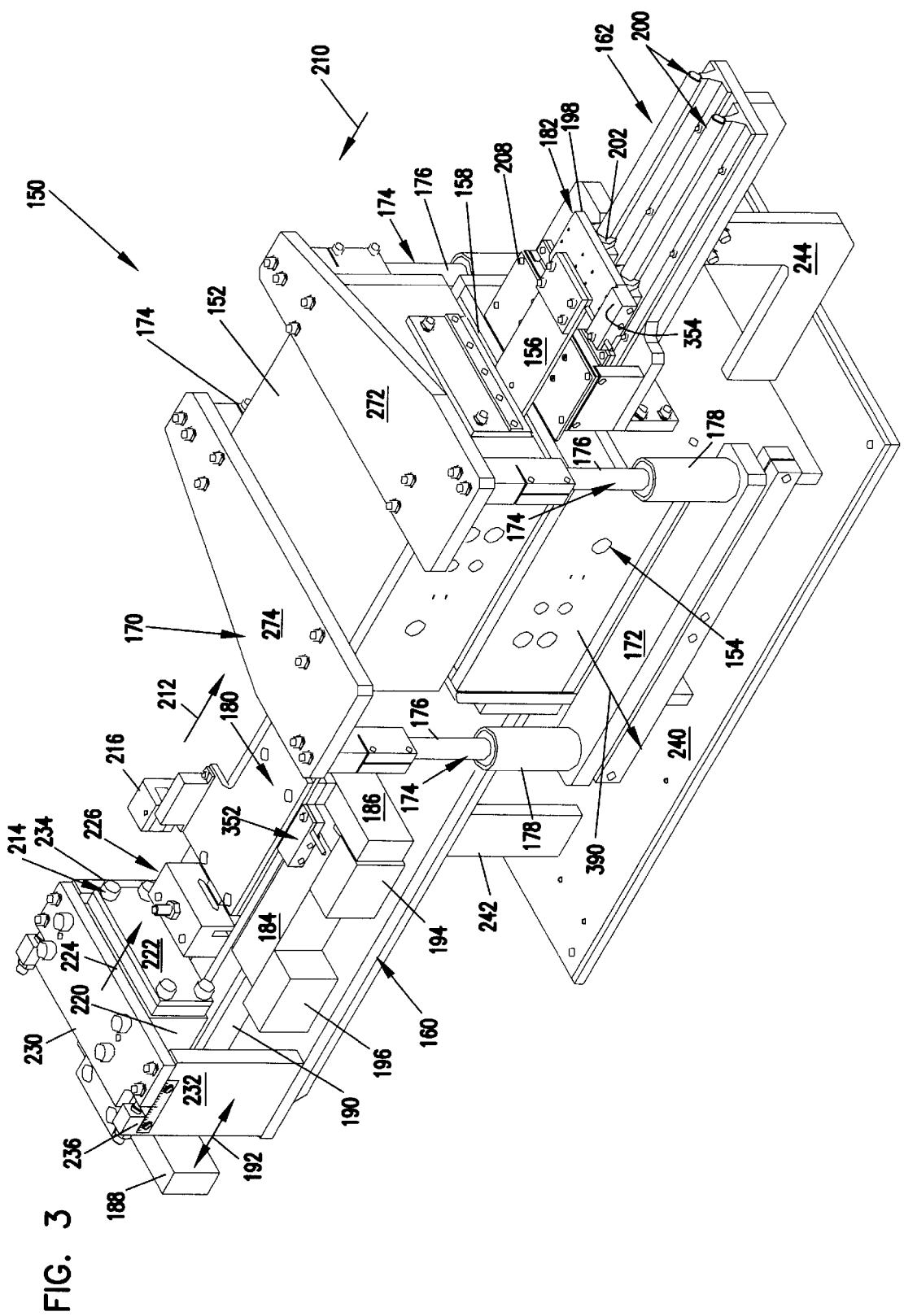
FIG. 3 is a perspective illustration of an embodiment of an assembly apparatus for magnetizing magnets of the present invention.

FIG. 3 illustrates an embodiment of an apparatus 150 for charging permanent magnets 116, 118. Apparatus 150 includes upper and lower coil box assemblies 152, 154 including charging coils (not shown) for charging magnets supported on a shuttle blade 156. Shuttle blade 156 extends through a gap 158 between upper and lower coil box assemblies 152, 154 and is movable from a retracted position (not shown) along an operating stroke for charging operation. In the retracted position, magnets are loaded onto or removed from the shuttle blade 156. The shuttle blade 156 is moved along the operating stroke to induce a magnet flux path to form flux zones 130, 132 and transition zone 134 as will be explained.

As shown in FIG. 3, shuttle blade 156 includes opposed first and second end portions and an intermediate charging zone (not visible in FIG. 3) supporting a magnet nest containing magnets for charging. Intermediate charging zone of the shuttle blade 156 extends through gap 158 between upper and lower coil box assemblies 152, 154 and opposed first and second ends are movably supported along opposed operating platforms 160, 162 supported in longitudinal alignment with gap 158 and opposed ends of the upper and lower coil box assemblies 152, 154.

Upper and lower coil box assemblies 152, 154 are movably supported in opposed spaced relation by a coil box support assembly. In the embodiment shown, the coil box support assembly includes an upper coil box support 170 and a lower coil box support 172. The upper coil box support 170 movably supports the upper coil box assembly 152 in opposed spaced relation to lower coil box assembly 154. The upper coil box support 174 movably supports the upper coil box assembly 152 relative to the lower coil box support 172 by posts 174. Posts 174 include post rods 176 movably supported relative to the lower coil box support 172 via linear bearing 178 to operate the upper coil box assembly 152 between an opened position and a closed operating position. Posts are spaced to provide a transverse opening for removing coil box assemblies for maintenance or service as will be explained.

Opposed first and second ends of the shuttle blade 156 are coupled to slides 180, 182 on operating platforms 160, 162 to movably support blade for operation along an operating stroke. In the embodiment shown in FIG. 3, slide 180 includes a base 184 and slide blocks 186, 188 moveable supported relative to base 184 via slide rods 190 slidably coupled to base 184. Slide blocks 186, 188 move relative to base 184 as illustrated by arrow 192. The first end portion of the shuttle blade is operable coupled to blocks 186, 188 and movable therewith as will be explained. Stop blocks 194, 196 define limit positions for movement of the shuttle blocks 186, 188 relative to slide base 184. Slide 182 includes a slide platform 198 movable along slide rails 200 via bearings 202. The second end of the shuttle blade 156 is coupled to slide platform 198 and movable therewith for operation.

Prior to charging operation, shuttle blade 156 is in a retracted position (not shown) with magnet nest or charging zone aligned with a load/unload platform 208. For charging operation, shuttle blade 156 is advanced along a first operating stroke as illustrated by arrow 210 by a shuttle actuator to move magnet nest through upper and lower coil boxes 152, 154 to magnetize the magnets. Shuttle blade 156 is moved along a second operating stroke in the opposed direction of the first operating stroke, as illustrated by arrow 212 via shift actuator 214 to clarify the transition zone of the charged magnets.

For charging operation, upper and lower coil boxes 152, 154 close to the charging position and the coils are energized to magnetize the magnets. The coil box assemblies 152, 154 are opened while the shuttle blade 156 is moved along the operating stroke and closed for charging operation. A first switch 216 (shown in FIG. 3) closes the upper and lower coil box assemblies 152, 154 when the blade 156 is fully retracted to a charging position for programmed operation of the apparatus. After completion of the operation cycle, the magnets are charged and the blade 156 returns to the load/unload position and triggers a second switch 216 (not visible in FIG. 3) for cycle completion.

In the embodiment shown, shift actuator 214 includes an actuator base 220 and actuator plate 222 movable relative to the base 220 as illustrated by arrow 224. Actuator plate 222 is aligned with and contacts a shift block 226 operable coupled to the shuttle blade 156 to move the shuttle blade along the second operating stroke for magnetization. Shift actuator 214 is supported by adjustable platform 230 which is adjustably supported relative to platform 160 and upper and lower coil box assemblies 152, 154 via blocks 232, 234. Ruler 236 on blocks 232, 234 provides a reference for adjusting the position of platform 230 for accurate placement of the shift actuator for placement of the flux and transition zones on the magnetized magnets as will be explained. Operating platforms 160, 162 and the coil box support assembly are supportedly coupled to an apparatus base 240. Legs 242 are coupled to base 240 to cooperatively support platform 160 and "L" shaped arm 244 is connected to base 240 to support platform 162.

Figure 4:
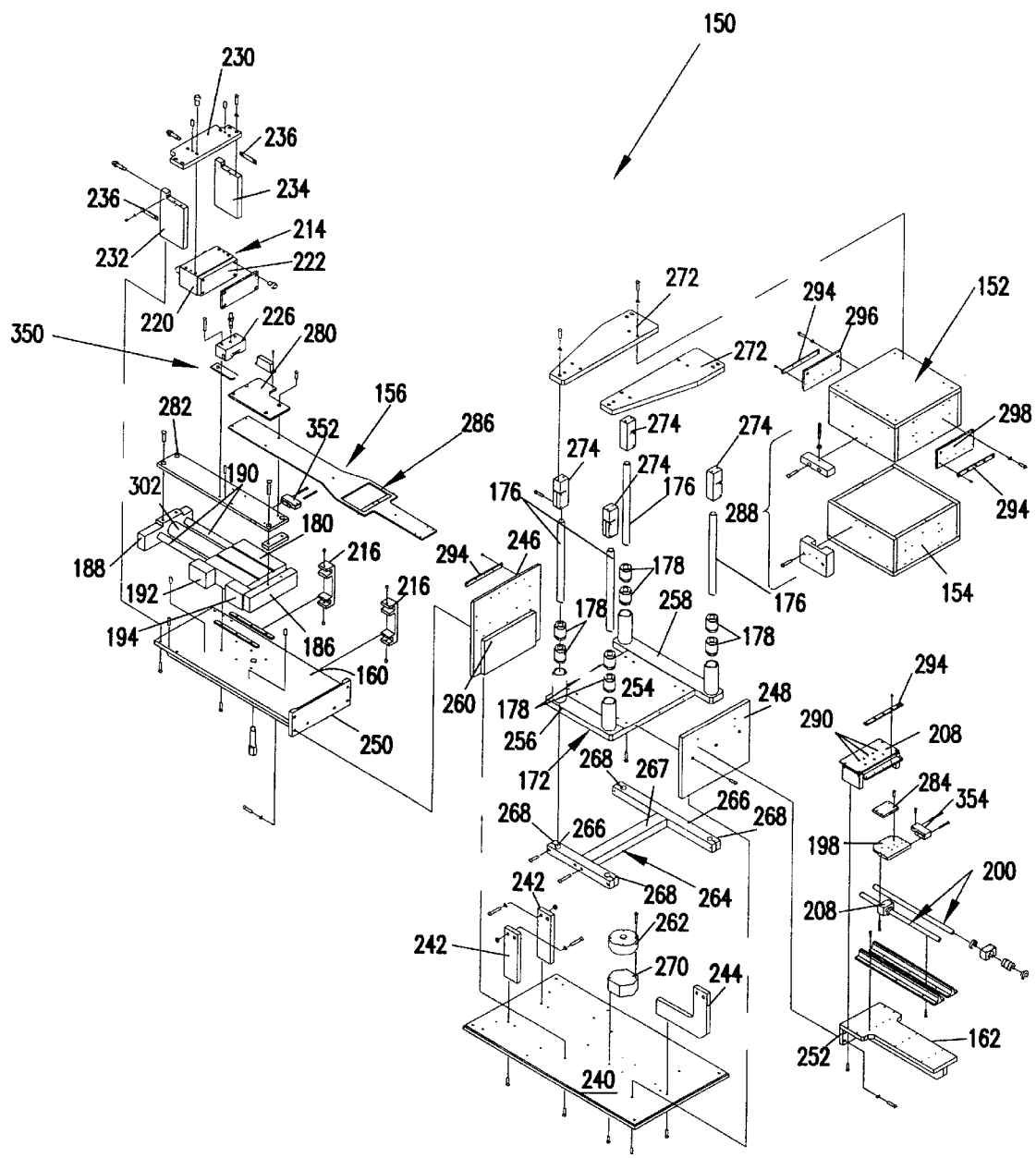
FIG. 4 is an exploded view of the apparatus of FIG. 3.

FIG. 4 is a detailed exploded view of the embodiment of the apparatus illustrated in FIG. 3, where like numbers are used to identify like parts. As shown, end plates 246, 248 are coupled to base 240 and support operating platforms 160, 162. Shuttle blade platforms 160, 162 are connected to end plates 246, 248 via mounting plates 250, 252 coupled to platforms 160, 162, respectively. The lower coil box support 172 includes a planar support base 254 and opposed rails 256, 258. Base 254 is supported on ledges 260 of end plates 246, 248 to fixedly support lower coil box assembly 154 relative to the base 240. As shown, posts are spaced along rails 256, 258. Rail 258 is sized to space opposed post 174 a sufficient distance to form transverse opening for removing coil box assemblies.

Linear bearings 178 movably support post rods 176 to raise and lower upper coil box assembly 152 relative to lower coil box assembly 154 for charging operation. In the embodiment shown in FIG. 4, a pneumatic actuator 262 abuts a cross frame 264 to raise and lower cross frame 264. Cross frame 264 includes opposed legs 266 connected by cross-member 267. Legs 266 include opposed slitted openings 268. Contact members (not shown) extends through slitted openings 268 and are aligned to contact rods 176 to raise and lower the upper coil box assembly 152 relative to the lower coil box assembly 154. Brackets 272 support the upper coil box assembly 152 and are coupled to rods 176 via holders 274 to form the upper coil box support assembly 170. Spacer 270 elevates actuator 262 to abut cross frame 264 to raise and lower cross frame 264. Contact members are raised and lowered via cross frame 264 to raise and lower brackets 272 to move the upper coil box assembly 152 between opened and closed operating positions.

As previously explained, a shuttle blade is movable supported by slides 180, 182 The first end portion of the shuttle blade 156 is coupled to slide blocks 186, 188 between an upper shuttle blade plate 280 and a lower shuttle blade plate 282 connected to slide blocks 186, 188. As shown, shift block 226 for shift actuator 214 is coupled to lower shuttle blade plate 282 to move shuttle blade along the second operating stroke. The second end of the shuttle blade 156 is coupled to slide platform 198 and upper plate 284 secures the second end of the shuttle blade 154 to slide platform 198 to movably support the second end of the shuttle blade along platform 162 for operation.

For load and unload operations, charging zone 286 (including an opening for supporting a magnet nest) of the shuttle blade is supported at a load/unload platform 208. Platform 208 includes a plurality of ferrous metal pins supported in pin holes 290 to hold magnetized magnets in the magnet nest so that the charged magnets do not pile on one another before removed. Platform 208 is formed of a lubricous plastic platform to facilitate movement of the shuttle blade therealong. Switch 288 signals when the upper and lower coil boxes are opened for operation of the slides and closed for charging operation to restrict movement of the slides.

Upper and lower lubricous sheets (not shown) extend through gap 158 to provide a slippery lubricous surface facing the shuttle blade for facilitating movement of the shuttle blade in the gap between the upper and lower coil box assemblies 152, 154 for charging operation. As shown, a first end of a lower lubricous sheet is connected to end plate 246 and a second end extends over platform 208 and is connected to a ledge surface or platform 208 via removable clamps 294 to provide a lubricous surface facing a lower surface of the shuttle blade. Ends of an upper lubricous sheet (not shown) are connected to plates 296, 298 supported on upper coil box assembly 152 and secured by clamps 294 to provide a lubricous surface facing an upper surface of the shuttle blade to facilitate movement of the shuttle blade.

In one embodiment, the lubricous sheet is a polyethylene tape and clamps 294 include a plurality of fastener openings spaced along the width of the tape to removably support ends of the sheet. An adhesive surface of the polyethylene tape includes a backing sheet so that the adhesive or tape does not adhere to the coil box assemblies so that the lubricous sheets can be periodically removed and replaced by detaching removable clamps 294. Since lubricous sheets are not adhesively adhered to the coil box assemblies or other components, sheets can be easily removed and exchanged when dirty or contaminated without disassembling components and scrubbing the adhesive from surfaces of the assembly components.

Figures 1, 5:
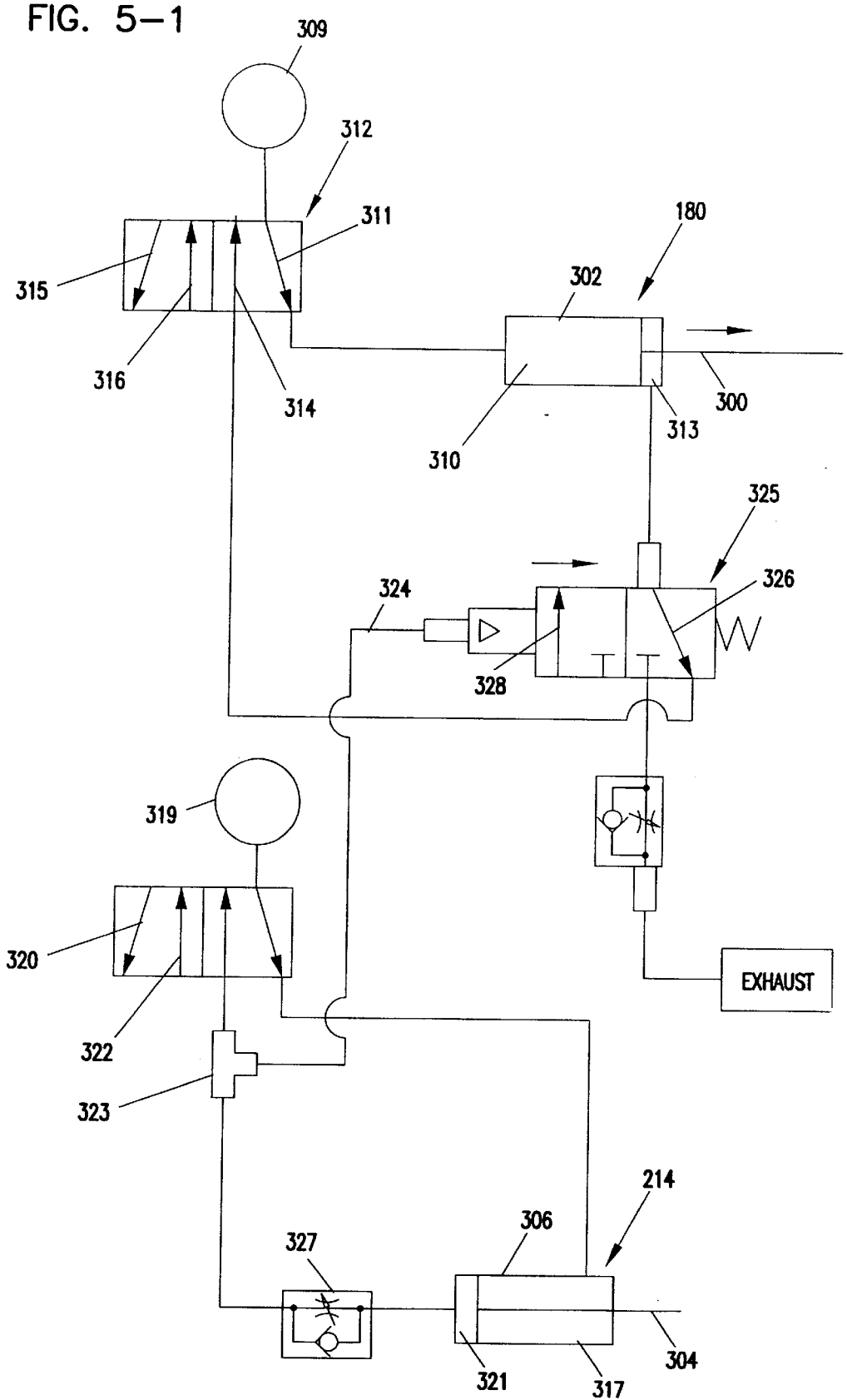
Figures 2, 5:
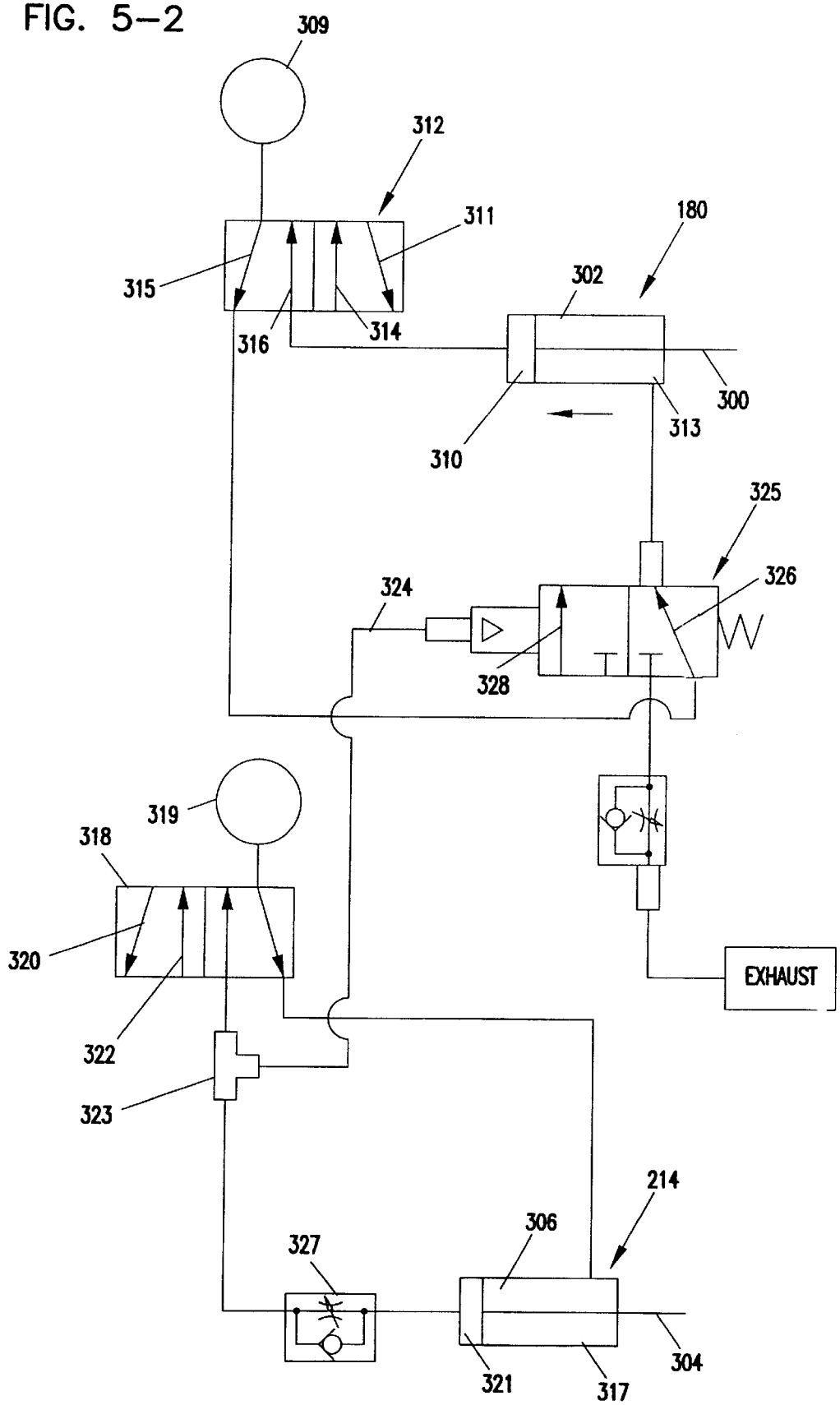
Figures 3, 5:
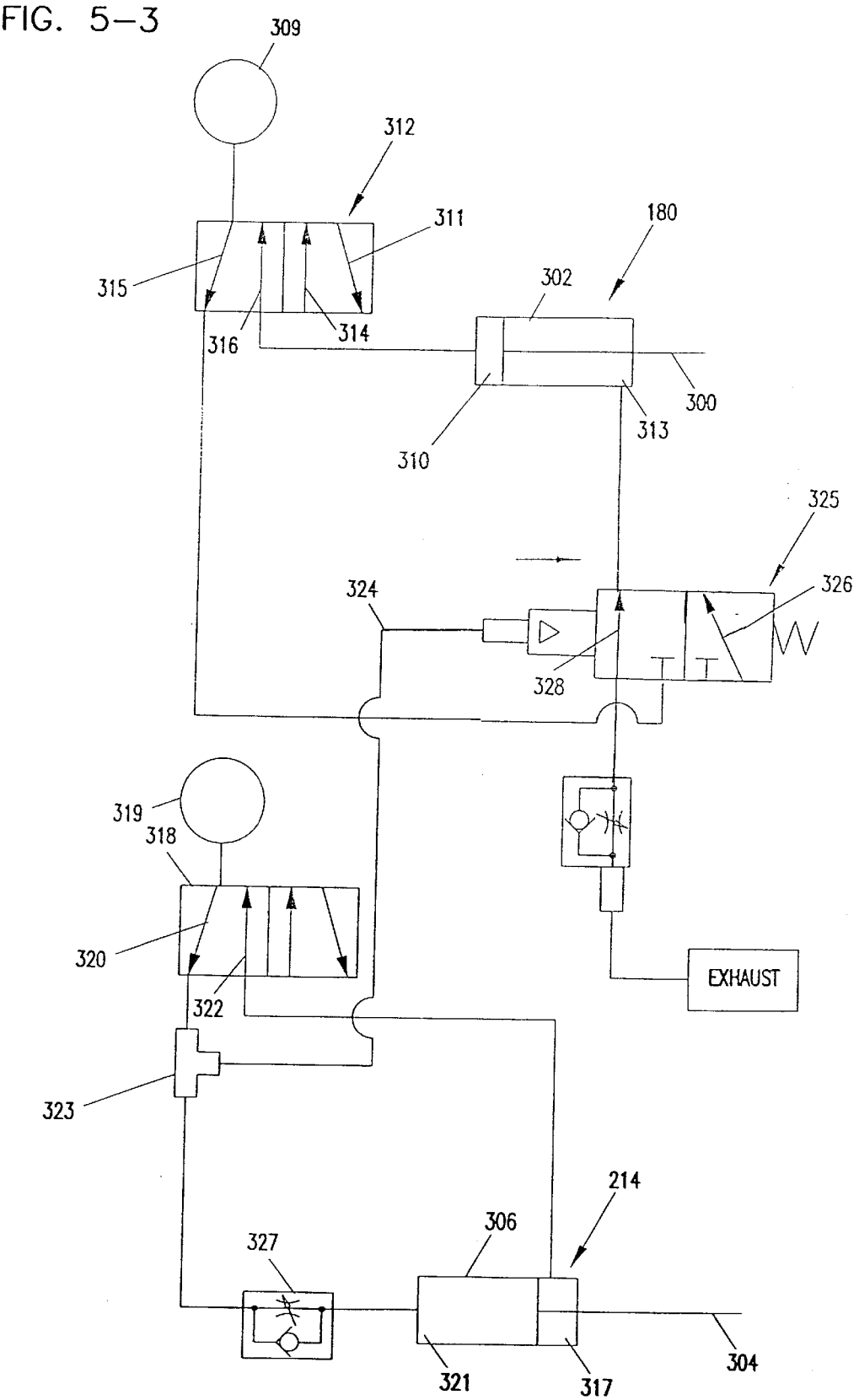

As previously explained, a shuttle actuator 180 and shift actuation 214 move blade along first and second operating strokes. As shown in FIGS. 4–5, shuttle actuator 180 includes a rod 300 operable in shuttle cylinder 302 and actuator 214 is operated by shift rod 304 coupled to actuator plate 222 and operable in shift cylinder 306. FIGS. 5-1 through 5-3 illustrate operation of rods 300, 304 in cylinders 302, 306 for moving blade 156 along operating strokes to position magnets for charging operating.

In FIG. 5-1, shuttle cylinder 302 is shown in a load/unload position to align magnet nest with platform 208. In the load/unload position rod 300 is extended in cylinder 302. Pressure from source 309 is supplied to chamber 310 through channel 311 of shift valve 312 to extend rod 300 and fluid is exhausted from chamber 313 through channel 314. For operation along the first operating stroke, valve 312 shifts to supply pressure through channel 315 to chamber 313 to retract rod 300 as illustrated in FIG. 5-2. Rod 300 is retracted to move blade as illustrated by arrow 210 in FIG. 3 to position magnets between upper and lower coil box assemblies for charging operation. Pressure is exhausted from chamber 310 through channel 316. Coil boxes are opened for moving the shuttle blade 156 along the operating strokes and are closed to charge magnets supported by the shuttle blade 156.

As illustrated in FIG. 5-1, prior to operation of the shift actuator, shift rod 304 is normally retracted in shift cylinder 306 via pressure supplied to chamber 317. Rod 304 is extended to move shuttle blade along a second operating or shift stroke as illustrated by arrow 212 in FIG. 3. As illustrated in FIG. 5-3 for operation, shift valve 318 shifts to supply pressure from source 319 through channel 320 to chamber 321 of cylinder 306 to extend rod 304 as shown. Fluid is exhausted from chamber 317 through channel 322. As shown, pressure from channel 322 flows through "T" connector 323 to line 324 to shift valve 325, normally biased with channel 326 opened to chamber 313 for operating actuator rod 300, to release pressure from chamber 313 of shuttle cylinder 302.

Pressure is released to move shift cylinder rod 304 in the opposed direction of actuator or cylinder 302. Sufficient pressure or force is released from chamber 313 of cylinder 302 to allow shift cylinder 306 to move shuttle blade in the opposed direction 212 as shown in FIG. 3. In particular, fluid pressure flows through "T" connector 323 and flow regulator 327 to chamber 321 to operate shift cylinder 306, as previously explained and shift valve 325 to open exhaust port 328 to release pressure from chamber 313 of shuttle cylinder 302 to operate shift cylinder 306. Thus, as described, shuttle and shift cylinders 302, 306 move shuttle blade 156 along operating strokes to position magnets supported by shuttle blade 156 for magnetization. In a preferred embodiment, operating fluid is gas, although application is not limited to a pneumatic operating fluid.

Alignment of the shuttle blade 156 and actuator 214 relative to the coil box assemblies is calibrated for accurate magnetization of the flux zones and the transition zone. For calibration, actuators move the shuttle blade 156 along the operating strokes and the magnets are magnetized. The magnetized magnets are tested for compliance. The position of shuttle blade 156 and shift actuator 214 can be adjusted relative to the coil box assemblies for adjusting alignment of the flux zones and transition zone of the tested magnets.

Figure 6:
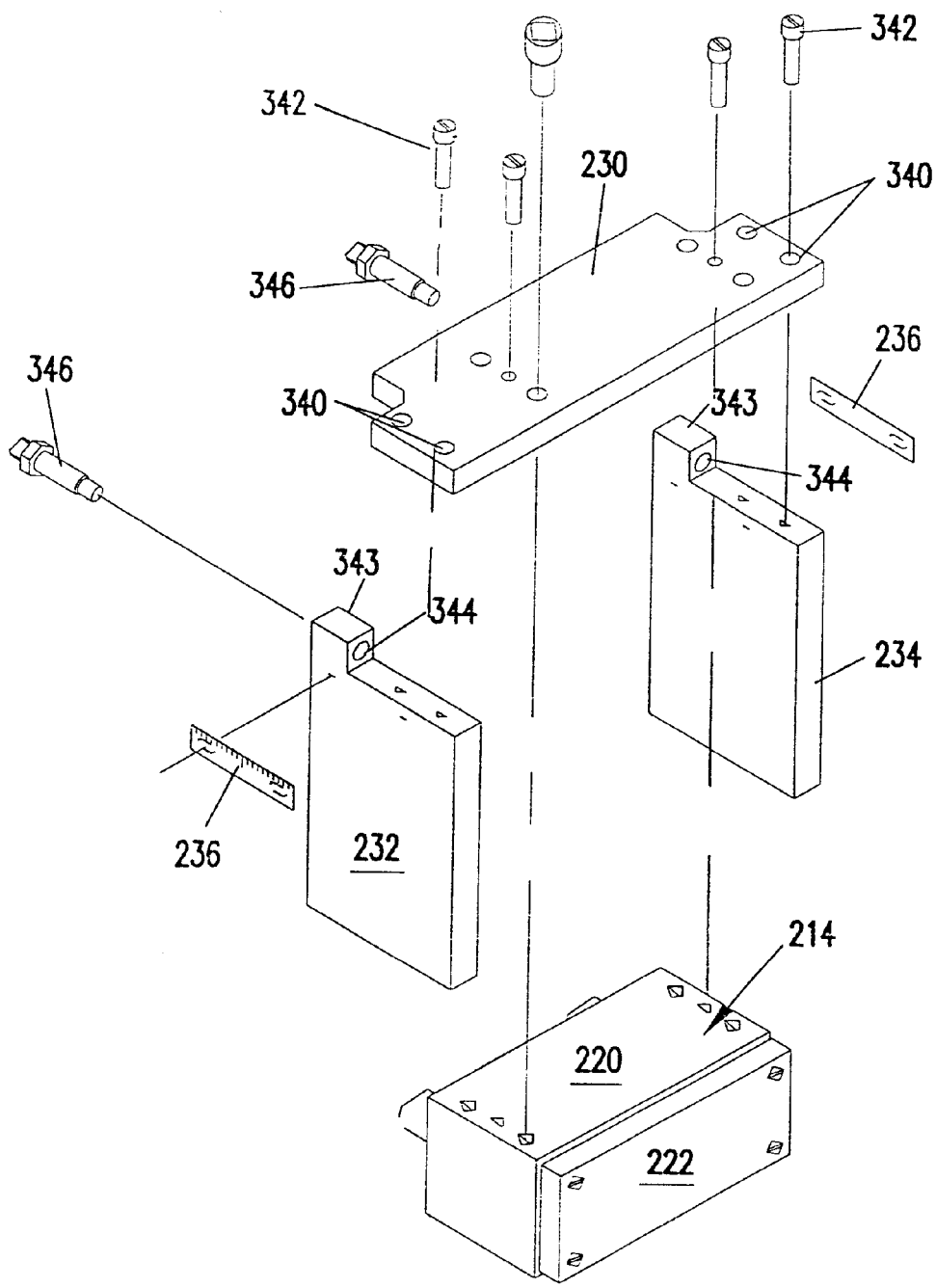
FIG. 6 is an exploded view of an embodiment of an adjustable support platform for a shift actuator.

As previously explained, the stroke of shift actuator 214 is adjustable without shims via adjustment of support platform 230. An embodiment of the adjustable platform 230 supporting actuator 214 is shown more clearly in FIG. 6. As illustrated by dashed lines, actuator 214 is connected to platform 230. Platform 230 includes elongated slots 340. Pins 342 extend through elongated slots 340 to adjustably secure platform 230 to blocks 232, 234. Blocks 232, 234 include step 343 having a bore 344 extending therethrough. A biasing pin 346 extends through bores 344 to contact platform 230 to shift the position of pins 342 in slots 340 for adjusting the operating position of shift actuator 214. As previously explained, blocks 232, 234 include rulers 236 or other graduations to adjust the position of platform 230 relative to blocks 232, 234 for calibrating shift actuator 214 for charging operations.

Attachment of shuttle blade to slides 180, 182 is adjusted to shift the position of shuttle blade 156 relative to the upper and lower coil box assemblies 152, 154 for calibration. The position of the shuttle blade is calibrated for x-y alignment of the magnets between the upper and lower coil box assemblies 152, 154 for magnetization. As shown in FIG. 4, and schematically in FIG. 7, apparatus includes an end gage 350 for locating the position of the shuttle blade along the longitudinal stroke axis (x-axis) and opposed spaced transverse gages 352, 354 for locating the position of opposed ends of the shuttle blades transverse to the stroke axis (y-axis). As previously explained, the position of the shuttle blade is calibrated to properly align the charging zone 286 relative to the upper and lower coil box assemblies 152, 154 and once the position is calibrated, gages 350, 352, 354 locate the calibrated x-y position of the shuttle blade 156.

FIGS. 8–9 illustrate an embodiment of an end gage 350. End gage 350 includes a gage plate 360 secured relative to shuttle blade plate 282 via shift block 226. Shift block 226 is connected to plate 282 via fastener holes 362, 364. Shift block includes a lower gage slot 366. Gage plate 360 is slidably disposed in gage slot 366 and is locked in place via a locking surface actuated via gage pin 368 as shown more clearly in FIG. 9. As shown, shift block 226 includes channel 370 to form flexible shoulder 372. Pin 368 shown in FIG. 8, extends through bore 374 to flex shoulder 372 as illustrated in phantom 372-1 to lock gage plate 360 in place to abut shuttle blade 256 coupled to shuttle blade plate 282 to located calibrated shuttle blade 156 along the longitudinal stroke axis (x-axis).

An embodiment of transverse gages 352, 354 is shown in FIG. 10. As shown, gages 352, 354 include a gage block 376 connected to slides 180, 182 (plate 282 and slide platform 198) through fastener holes 378. A gage pin (not shown) extends through a slitted channel 380 of block 376. A fastener (not shown) is inserted into hole 382 to tighten slitted channel 380 about gage pin to transversely locate the calibrated shuttle blade 156 transverse to the stroke axis (y-axis). Once the position of the shuttle blade is calibrated, shuttle blade 156 can be removed for maintenance or service of the operating components and reassembled in alignment with gages 350, 352, 354 without extensive recalibration of the position of the shuttle blade 156.

In prior apparatus, the device was completely disassembled to access the lower coil box for maintenance or service. As shown in FIGS. 3–4, rails 258 is longer than the width of the coil box assemblies and the spacing between posts 174 supported by rail 258 is larger than the transverse width of the lower coil box to provide a transverse opening as shown in FIG. 3 between posts 174 to slide the lower coil box from the support plate for maintenance. As previously explained, for maintenance, upper coil box is disassembled from upper coil box support. Shuttle blade is detached from slides 180, 182 and the lower coil box is slid through transverse opening, as illustrated by arrow 390 in FIG. 3 for ease of maintenance and service. The end gage 350 and traverse gages 352, 354, as previously explained, allow for reassembly of the shuttle blade without extensive recalibration. Thus, the apparatus described provides advantages over prior apparatus since magnetizing components are accessible without complete disassembly of the apparatus, thus decreasing the time the device is removed from production and the time required to recalibrate the device for production.

A magnetizing apparatus 150 for magnetizing magnets including an assembly construction for easy maintenance and service which does not need to be completely disassembly for maintenance or service of magnetizing components and which does not require extension recalibration prior to resuming production. The apparatus includes a transverse opening wide enough to slidably remove the lower coil box assembly for maintenance or service. Gages 350, 352, 354 locate the shuttle blade relative to the upper and lower coil box assemblies for realigning the shuttle blade 156 when the shuttle blade is removed. Apparatus is operable along operating stroke via an adjustable actuator 214 for calibration alignment of the blade relative to the upper and lower coil box assemblies 152, 154.

It is to be understood that even through numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a voice coil motor for a disc drive system, it will be appreciated by those skilled in the art that the teachings of the present invention can be applied to other systems, without departing from the scope and spirit of the present invention.

What is claimed is:

1. A magnetizing apparatus comprising:
   a base;
   a first coil box assembly having a first magnetizing coil;
   a second coil box assembly having a second magnetizing coil and the first and second coil box assemblies supporting the first and second magnetizing coils in opposed spaced relation;
   a shuttle blade adapted to support magnets to magnetize the magnets and operable along a shuttle blade stroke along a longitudinal axis between a retracted position and an operating position aligned with the opposed first and second magnetizing coils;
   a longitudinal gage to align a longitudinal position of the shuttle blade along the longitudinal axis; and
   a transverse gage to align a transverse position of the shuttle blade along an axis transverse to the longitudinal axis, the longitudinal and transverse gages longitudinally and transversely locating the shuttle blade relative to the first and second coil box assemblies.

2. The magnetizing apparatus of claim 1 and further comprising:
   a first coil box support assembly operably supported relative to the base;
   a second coil box support assembly;
   a plurality of posts supporting the first coil box support assembly and the second coil box support assembly in opposed spaced relation, the plurality of posts including at least two posts on a first end of the first and second coil box assemblies and at least two posts on a second opposed end of the first and second coil box assemblies;
   first and second operating platforms on the opposed first and second ends of the first and second coil box assemblies and opposed portions of the shuttle blade operably supported relative to the first and second operating platforms;
   at least one of the first end posts and at least one of the second end posts being spaced a distance apart which is greater than a width dimension of the first and second coil box assemblies between the opposed first and second ends to form a transverse opening sized to slidably remove the first coil box assembly.

3. The magnetizing apparatus of claim 2 wherein the first coil box support assembly includes a support plate having:
   a base portion having a planar support surface; and
   opposed rails coupled to the base portion and supporting the plurality of posts, at least one of the rails having sufficient length to support the at least one post at the first end and the at least one post at the second end the distance apart which is greater than the width dimension of the first and second coil box assemblies between the opposed first and second ends.

4. The magnetizing apparatus of claim 2 wherein the plurality of posts each include post rods movably supported via linear bearings relative to a post base to move the second coil box assembly between an opened position spaced from the first coil box assembly and a closed charging position proximate to the first coil box assembly.

5. The magnetizing apparatus of claim 2 wherein the second coil box support assembly includes a plurality of spaced brackets to removably support the second coil box assembly.

6. The magnetizing apparatus of claim 2 including an actuator coupled to the second coil box support assembly to move the second coil box assembly between an open position and a closed operating position.

7. The magnetizing apparatus of claim 1 including opposed operating platforms coupled to the base and positioned on opposed first and second ends of the first and second coil box assemblies and the opposed operating platforms including opposed first and second slides movable along an operating stroke and opposed first and second portions of the shuttle blade are coupled to the first and second slides and movable therewith to move the shuttle blade along the shuttle blade stroke.

8. The magnetizing apparatus of claim 1 wherein the shuttle blade includes opposed first and second end portions and an intermediate portion and including:

opposed first and second operating platforms coupled to the base and positioned on opposed first and second ends of the first and second coil box assemblies;

the first end portion of the shuttle blade being coupled to a slide on the first operating platform and the second end portion of the shuttle blade being coupled to a slide on the second operating platform and the intermediate portion extending through a gap between the opposed first and second coil box assemblies; and opposed first and second transverse gages to align the transverse position of the opposed first and second end portions of the shuttle blade on the slides on the first and second operating platforms.

9. The magnetizing apparatus of claim 1 wherein the longitudinal gage includes:

a gage plate;

a block including a gage slot, the gage plate being slidable in the gage slot between multiple longitudinal positions; and a locking surface actuatable to abut the gage plate to lock the position of the gage plate for locating the longitudinal position of the gage plate.

10. The magnetizing apparatus of claim 1 wherein the transverse gage includes a gage block including a channel adapted to slidably support a gage pin to locate the transverse position of the shuttle blade.

11. The magnetizing apparatus of claim 1 wherein the shuttle blade is movable along the shuttle blade stroke via an adjustable shuttle blade actuator assembly including an actuator adjustably supported relative to the base to provide adjustable stroke positions to adjust longitudinal operating positions of the shuttle blade along the shuttle blade stroke.

12. The magnetizing apparatus of claim 11 wherein the adjustable actuator assembly includes:

an adjustable platform adjustable along the longitudinal axis relative to a longitudinal position of the first and second coil box assemblies, the actuator being supported by the adjustable platform and adjustable therewith to locate the longitudinal operating positions of the shuttle blade relative to the first and second coil box assemblies.

13. The magnetizing apparatus of claim 12 wherein the adjustable platform is supported by a platform base and the platform base includes measurement indicia to calibrate a position of the adjustable platform.

14. The magnetizing apparatus of claim 12 wherein the shuttle blade is movable along a first operating stroke via a first actuator and movable along a second operating stroke via a second actuator and the second actuator is supported by the adjustable platform.

15. The magnetizing apparatus of claim 14 wherein the first and second actuators include first and second fluid actuated cylinder rods operable to move the shuttle blade in opposed directions during the first and second operating strokes of the shuttle blade and fluid pressure is released from the first fluid actuated cylinder rod to operate the second fluid actuated cylinder rod to move the shuttle blade in opposed directions.

16. A magnetizing apparatus comprising:

a base;

first and second coil box assemblies having first and second magnetizing coils supported in opposed spaced relation relative to the base to define a gap therebetween;

a shuttle blade movable in the gap between the opposed first and second magnetizing coils;

a shuttle blade actuator coupled to the shuttle blade to move the shuttle blade along a shuttle blade stroke; and a platform adjustably supported relative to the base and the shuttle blade actuator coupled to the platform to provide longitudinally adjustable stroke positions to locate the shuttle blade relative to the first and second magnetizing coils during movement along the shuttle blade stroke.

17. The magnetizing apparatus of claim 16 and comprising:

a lubricious sheet extending through the gap between the first and second opposed magnetizing coils, and opposed clamps adapted to removably support opposed end portions of the lubricous sheet relative to opposed first and second ends of the first and second coil box assemblies.

18. The magnetizing apparatus of claim 16 and further comprising:

a first coil box support assembly operably supported relative to the base;

a second coil box support assembly;

a plurality of posts supporting the first coil box support assembly and the second coil box support assembly in opposed spaced relation, the plurality of posts including at least two posts on a first end of the first and second coil box assemblies and at least two posts on a second opposed end of the first and second coil box assemblies;

first and second operating platform on the opposed first and second ends of the first and second coil box assemblies supporting opposed portions of the shuttle blade; and at least one of the first end posts and at least one of the second end posts being spaced a distance apart which is greater than a width dimension of the first and second coil box assemblies between the opposed first and second ends to form a transverse opening sized to slidably remove the first coil box assembly.

19. A magnetizing apparatus comprising:

a shuttle blade movably supporting a magnet relative to opposed first and second coil box assemblies; and means for locating a position of the shuttle blade relative to the first and second coil box assemblies.

* * * * *